United States Patent
Kawakami (10) Patent No.: US 9,434,446 B2
(45) Date of Patent: Sep. 6, 2016

(54) ELECTRIC BICYCLE

(75) Inventor: Masafumi Kawakami, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/375,367

(22) PCT Filed: Mar. 8, 2012

(86) PCT No.: PCT/JP2012/001578
§ 371 (c)(1),
(2), (4) Date: Jul. 29, 2014

(87) PCT Pub. No.: WO2013/132535
PCT Pub. Date: Sep. 12, 2013

(65) Prior Publication Data
US 2015/0020621 A1 Jan. 22, 2015

(51) Int. Cl.
B62M 6/50 (2010.01)
B62M 6/60 (2010.01)
F16C 3/10 (2006.01)
B62M 3/00 (2006.01)

(52) U.S. Cl.
CPC ............... B62M 6/50 (2013.01); B62M 3/003 (2013.01); B62M 6/60 (2013.01); F16C 3/10 (2013.01); Y10T 74/18232 (2015.01)

(58) Field of Classification Search
CPC .......... B62M 6/40; B62M 6/50; B62M 6/60; F16C 3/06; F16C 3/10
See application file for complete search history.

(56) References Cited

U.S. PATENT DOCUMENTS 3,759,592 A * 9/1973 Carlson ................. F16C 25/083
346/137
5,749,429 A * 5/1998 Yamauchi ................ B62M 6/55
180/206.2
6,116,114 A 9/2000 Edwards
(Continued)

FOREIGN PATENT DOCUMENTS

CN 1118434 A 3/1996
CN 101279630 A 10/2008
(Continued)

OTHER PUBLICATIONS

Extended European Search Report, Mar. 13, 2015; European Patent Application No. 12870422.8 (8 pages).
(Continued)

Primary Examiner — Joseph Rocca
Assistant Examiner — Maurice Williams
(74) Attorney, Agent, or Firm — Hamre, Schumann, Mueller & Larson, P.C.

(57) ABSTRACT

An electric bicycle is provided that can increase the diameter of the joining section between a crankshaft and a crank arm, suppress an increase in manufacturing cost, and minimize a size increase of a hanger with a torque sensor disposed in the hanger. A crankshaft 17 is divided into a crankshaft body 17A on the periphery of which a torque sensor 23 is disposed, and an auxiliary crankshaft 17B connected to one side of the crankshaft body 17A. A diameter D1 of the joining section between the auxiliary crankshaft 17B and a crank arm 18B and a diameter D3 of the joining section between the crankshaft body 17A and a crank arm 18A are larger than a diameter D2 of the connecting section between the crankshaft body 17A and the auxiliary crankshaft 17B.

6 Claims, 11 Drawing Sheets

(56) References Cited

U.S. PATENT DOCUMENTS

| | | | |
|---|---|---|---|
| 7,861,599 B2 | 1/2011 | Meggiolan | |
| 8,485,050 B2 * | 7/2013 | Yao | B62M 6/50 73/862.08 |
| 8,797,027 B2 | 8/2014 | Glueck et al. | |
| 2011/0006760 A1 * | 1/2011 | Glueck | B62M 3/003 324/207.25 |
| 2012/0166105 A1 * | 6/2012 | Biermann | A63B 24/0062 702/43 |

FOREIGN PATENT DOCUMENTS

| | | | | |
|---|---|---|---|---|
| CN | WO 2012136143 A1 * | 10/2012 | | G01L 3/104 |
| DE | 102007062156 | 6/2009 | | |
| DE | 202010017365 | 10/2011 | | |
| EP | 7 683 093 B1 | 10/1999 | | |
| JP | 8-297059 | 11/1996 | | |
| JP | 2000-335475 | 12/2000 | | |
| JP | 2003-118673 | 4/2003 | | |
| JP | 2006-347547 | 12/2006 | | |
| JP | 2007-230410 | 9/2007 | | |
| JP | 2009-6991 | 1/2009 | | |
| JP | WO 2013042319 A1 * | 3/2013 | | B62M 6/50 |
| JP | WO 2014184826 A1 * | 11/2014 | | B62M 6/50 |

OTHER PUBLICATIONS

Office Action issued in corresponding Chinese Patent Application No. 201280071107.4 on Dec. 14, 2015 (6 pages).

* cited by examiner

ELECTRIC BICYCLE

TECHNICAL FIELD

The present invention relates to an electric bicycle that can be driven by an auxiliary driving force generated by an electric motor in addition to a human driving force generated by a pedal force from a pedal.

BACKGROUND ART

A known electric bicycle (power-assisted bicycle) includes a power storage such as a battery and an electric motor powered by the power storage. Such an electric bicycle can be easily driven even on an uphill road by adding an auxiliary driving force (assist force) of the electric motor to a pedal force (human driving force) from a pedal. In such an electric bicycle, a force corresponding to a pedal force applied to the pedal is detected by a torque sensor, and then an auxiliary driving force corresponding to the pedal force is generated from the electric motor.

In this case, as a method of detecting a force corresponding to a pedal force by means of the torque sensor, the torque sensor is disposed near, for example, a crankshaft to detect a force transmitted from the crankshaft to a chain ring (also called a front sprocket or a crank gear), or the torque sensor is disposed in, for example, the hub of a rear wheel to detect a force transmitted to the rear wheel through a chain.

In the method of detecting a force transmitted to the rear wheel through the chain, however, the torque sensor detects the force through a force transmission path such as the chain. This may change or lose the direction of a force or an amount of a force through the force transmission path such as the chain, preventing a direct measurement of a force to the pedal so as to reduce correspondence with a pedal force.

In contrast, in the method of detecting a force transmitted from the crankshaft to the chain ring, the torque sensor does not detect the force through the transmission path such as a chain. Thus, a pedal force can be measured in a relatively satisfactory manner.

If a force transmitted from the crankshaft to the crank gear is detected by the torque sensor, conventionally, a motor unit containing the electric motor via a bracket is disposed below, for example, a hanger (also called a bottom bracket) that connects a lower pipe (also called a main pipe), a vertical pipe (also called a seat tube), and a chain stay. The torque sensor is disposed at the front of the motor unit. Specifically, the crankshaft is rotationally supported at the front of the motor unit disposed below the hanger, a torque detecting cylinder that transmits the rotation of the crankshaft to the crank gear is disposed around the crankshaft coaxially with the crankshaft, and the torque sensor is attached to the torque detecting cylinder (Patent Literature 1, etc.).

In a typical bicycle, however, a crankshaft is rotatably supported at the location of the hanger. Thus, a structure that supports a crank with the motor unit disposed below the hanger is a frame structure that is different from that of the typical bicycle, disadvantageously leading to uncomfortable feeling and higher manufacturing cost. Moreover, in order to set the crankshaft as high as that of the typical bicycle from the ground, the hanger connected to the lower pipe and so on needs to be disposed in the upper part of the bicycle, leading to the need for locating the lower pipe as well in the upper part of the bicycle. This disadvantageously makes it difficult for a rider to move a foot over the lower pipe when the rider rides on or gets off the electric bicycle.

In order to overcome the drawbacks, in electric bicycles disclosed in Patent Literatures 2 and 3 and so on, a crankshaft is rotatably supported at the location of a hanger as in the typical bicycle, the hanger containing a torque sensor. With this configuration, the frame structure of the electric bicycle is similar to that of the typical bicycle, thereby suppressing uncomfortable feeling and an increase in manufacturing cost to a certain level. Moreover, the hanger and the lower pipe are located as in the typical bicycle, allowing a rider to easily move a foot over the lower pipe.

CITATION LIST

Patent Literature

Patent Literature 1: Japanese Patent Laid-Open No. 2003-118673
Patent Literature 2: Japanese Patent Laid-Open No. 8-297059
Patent Literature 3: Japanese Patent Laid-Open No. 2007-230410

SUMMARY OF INVENTION

Technical Problem

In an athletic bicycle such as a mountain bike or a sport bicycle, the joining section between a crank arm and a crankshaft may have a larger diameter than that of the typical bicycle so as to have higher stiffness than the typical bicycle. Also in the manufacture of an athletic electric bicycle such as a mountain bike or a sport electric bicycle, as in the case of a bicycle, a larger force may be applied to the joining section between a crank arm and a crankshaft than that of the typical bicycle. Thus, the joining section between the crank arm and the crankshaft is desirably larger in diameter than that of a typical electric bicycle so as to have larger stiffness.

However, if the crankshaft of an electric bicycle is larger in diameter than a conventional crankshaft, a special torque sensor is necessary for the large-diameter crankshaft. This may considerably increase the manufacturing cost. Moreover, using the crankshaft having a large diameter increases the size of the torque sensor and thus the torque sensor needs to be located in a special hanger having quite a large diameter. Hence, using the special hanger having quite a large diameter may further increase the manufacturing cost or the size increase of the hanger may cause uncomfortable feeling.

The present invention has been devised to solve the problems. An object of the present invention is to Provide an electric bicycle that can suppress an increase in manufacturing cost and minimizes a size increase of a hanger containing a torque sensor with the joining section having a large diameter between a crankshaft and a crank arm.

Solution to Problem

In order to solve the problems, the present invention is an electric bicycle that can be driven by adding an auxiliary driving force generated by an electric motor to a human driving force generated by a pedal force from pedal, the electric bicycle including: a torque sensor that detects a force corresponding to a pedal force with a crankshaft rotatably disposed in a hanger coupled to the lower end of a vertical pipe, wherein the crankshaft is divided into a crankshaft body on the periphery of which the torque sensor is disposed, and an auxiliary crankshaft connected to one side of the crankshaft body, and the diameter of the joining section between the auxiliary crankshaft and a crank arm and the diameter of the joining section between the crankshaft body and the crank arm are larger than the diameter of the connecting section between the crankshaft body and the auxiliary crankshaft. It is preferable that the crankshaft body has a large-diameter part and a small-diameter part having a smaller diameter than the large-diameter part, the small-diameter part has a torque detection cylinder that is fit onto the small-diameter part so as to integrally rotate with the small-diameter part, the torque sensor having a magnetostriction portion formed on the periphery of the torque detection cylinder, and the auxiliary crankshaft is coupled to the end of the small-diameter part.

With this configuration, the crankshaft is divided into the crankshaft body on the periphery of which the torque sensor is disposed, and the auxiliary crankshaft connected to one side of the crankshaft body, and the diameter of the joining section between the auxiliary crankshaft and the crank arm and the diameter of the joining section between the crankshaft body and the crank arm are larger than the diameter of the connecting section between the crankshaft body and the auxiliary crankshaft. This increases the diameter of the joining section between the auxiliary crankshaft and the crank arm of the crankshaft body, thereby keeping high stiffness.

The crankshaft is divided into the crankshaft body and the auxiliary crankshaft. Thus, even if the torque sensor is attached to a narrow portion on the crankshaft body, the auxiliary crankshaft subsequently connected to the crankshaft body facilitates the assembly of the crankshaft and the torque sensor in the hanger. Moreover, the crankshaft body is identical in diameter to a conventional crankshaft, allowing the torque sensor to have the same size and shape as a conventional torque sensor. Thus, unlike in the case of a crankshaft having a larger diameter than the conventional crankshaft and a torque sensor sized accordingly, the crankshaft, the torque sensor, and the hanger can have small sizes (suppressed size increase). The use of the conventional torque sensor can reduce manufacturing cost.

According to the present invention, the crankshaft body has a point near the joining section between the crankshaft body and the auxiliary crankshaft, the point being rotatably supported by a bearing, a wire guide member is disposed between the bearing and an inner cylinder disposed in the hanger, and the torque sensor is connected to a torque sensor connecting wire that is laterally extended out of the hanger through the wire guide member. With this configuration, the torque sensor connecting wire can be satisfactorily extended out of the hanger.

According to the present invention, a portion where the torque sensor connecting wire protrudes from the side of the hanger is covered with a wire cap circular in side view. With this configuration, the torque sensor connecting wire extended from any position in the circumferential direction of the hanger can be extended from a predetermined point of the wire cap.

According to the present invention, the hanger contains the metallic inner cylinder having bearings provided in both of the left and right ends of the inner cylinder, the bearing rotatably supporting the crankshaft body, and the inner cylinder covers the torque sensor, the torque detection cylinder on the periphery of which the magnetostriction portion of the torque sensor is formed, and a region between the bearings on the crankshaft body.

With this configuration, even if rainwater enters the hanger through the vertical pipe, the inner cylinder prevents rainwater from entering the location of the torque sensor. Moreover, the metallic inner cylinder can prevent external noise or the like from entering the signal lines of the torque sensor. Furthermore, the locations of the crankshaft and the torque sensor can be combined into a unit covered with the inner cylinder and thus the crankshaft and the torque sensor can be relatively easily assembled into the hanger with high efficiency.

According to the present invention, the large-diameter part of the crankshaft body has a rotary force transmission cylinder that is rotatably fit onto the large-diameter part via a large-diameter bearing part, the rotary force transmission cylinder and the torque detection cylinder are connected so as to integrally rotate with each other, and the rotary force transmission cylinder has a human driving force output ring with gear portions in multiple stages, the human driving force output ring being fit onto the rotary force transmission cylinder so as to integrally rotate with the rotary force transmission cylinder.

With this configuration, the human driving force output ring having the gear portions in multiple stages is disposed at a location corresponding to the large-diameter part of the crankshaft body via the rotary force transmission cylinder and the large-diameter bearing part. Thus, even if a large force is applied from the driving force output ring to the crankshaft body and so on when the gear portions are switched, the force can be satisfactorily received.

According to the present invention, the rotary force transmission cylinder is rotatably disposed via the bearing on the metallic inner cylinder provided in the hanger, the human driving force output ring having the gear portions in the multiple stages is fit onto the rotary force transmission cylinder, a position regulating ring that regulates the position of the bearing in the axial direction is fit into a groove formed on the inner cylinder, the groove has an inclined surface that increases in diameter toward the location of the bearing, and the position regulating ring with a reduced diameter is disposed in the groove.

With this configuration, the bearing rotatably supporting the rotary force transmission cylinder and the human driving force output ring having the gear portions in the multiple stages are satisfactorily positioned in the axial direction of the crankshaft by the position regulating ring. Thus, the gear portions formed on the human driving force output ring are also satisfactorily positioned in the axial direction. This can prevent the occurrence of problems that may cause a faulty changing operation on the gear portions of the chain, thereby satisfactorily changing the gear portions of the chain.

Advantageous Effects of Invention

According to the present invention, the crankshaft is divided into the crankshaft body on the periphery of which the torque sensor is disposed, and the auxiliary crankshaft connected to one side of the crankshaft body, and the diameter of the joining section between the auxiliary crankshaft and the crank arm and the diameter of the joining section between the crankshaft body and the crank arm are larger than the diameter of the connecting section between the crankshaft body and the auxiliary crankshaft. This increases the diameter of the joining section between the auxiliary crankshaft and the crank arm of the crankshaft body, thereby keeping high stiffness on the joining section. Additionally, the reliability of the electric bicycle can be improved. Furthermore, the joining section between the auxiliary crankshaft and the crank arm can be increased in diameter; meanwhile, the crankshaft body is identical in diameter to the conventional crankshaft, allowing the torque sensor to have the same size and shape as the conventional torque sensor. The crankshaft, the torque sensor, and the hanger can have small sizes (suppressed size increase). The use of the conventional torque sensor can reduce the manufacturing cost.

Moreover, the wire guide member is disposed between the bearing rotatably supporting the crankshaft body and the inner cylinder disposed in the hanger, and the torque sensor is connected to the torque sensor connecting wire that is laterally extended out of the hanger through the wire guide member. With this configuration, the torque sensor connecting wire can be satisfactorily extended out of the hanger. Furthermore, the portion where the torque sensor connecting wire protrudes from the side of the hanger is covered with the wire cap circular in side view. With this configuration, the torque sensor connecting wire extended from any position in the circumferential direction of the hanger can be extended from a predetermined point of the wire cap, and the torque sensor connecting wire can be satisfactorily covered with the wire cap, advantageously improving the appearance.

Moreover, the hanger contains the metallic inner cylinder having the bearings provided in both of the left and right ends of the inner cylinder, the bearing rotatably supporting the crankshaft body, and the inner cylinder covers the torque sensor, the torque detection cylinder on the periphery of which the magnetostriction portion of the torque sensor is formed, and the region between the bearings on the crankshaft body. With this configuration, even if rainwater enters the hanger through the vertical pipe, the inner cylinder prevents rainwater from entering the location of the torque sensor, improving the reliability. Moreover, the metallic inner cylinder can prevent external noise or the like from entering the signal lines of the torque sensor, also improving the reliability. Furthermore, the locations of the crankshaft and the torque sensor can be combined into the unit covered with the inner cylinder and thus the crankshaft and the torque sensor can be relatively easily assembled with high efficiency.

Moreover, the large-diameter part of the crankshaft body has the rotary force transmission cylinder that is rotatably fit onto the large-diameter part via the large-diameter bearing part, the rotary force transmission cylinder and the torque detection cylinder are connected so as to integrally rotate with each other, and the rotary force transmission cylinder has the human driving force output ring with the gear portions in the multiple stages, the human driving force output ring being fit onto the rotary force transmission cylinder so as to integrally rotate with the rotary force transmission cylinder. Thus, even if a large force is applied from the driving force output ring to the crankshaft body and so on when the gear portions are switched, the force can be satisfactorily received, also improving the reliability.

The rotary force transmission cylinder is rotatably disposed via the bearing on the metallic inner cylinder provided in the hanger, the human driving force output ring having the gear portions in the multiple stages is fit onto the rotary force transmission cylinder, the position regulating ring that regulates the position of the bearing in the axial direction is fit into the groove formed on the inner cylinder, the groove has the inclined surface that increases in diameter toward the location of the bearing, and the position regulating ring with a reduced diameter is disposed in the groove. Thus, the human driving force output ring is fit onto the rotary force transmission cylinder such that the position of the human driving force output ring is satisfactorily regulated in contact with the bearing so as not to move into the hanger. This can prevent the occurrence of problems that may cause a faulty changing operation on the gear portions of the chain, also improving the reliability.

DESCRIPTION OF EMBODIMENTS

An electric bicycle according to an embodiment of the present invention will be described below with reference to the accompanying drawings. In the explanation, a lateral direction is a direction set with respect to a traveling direction.

Figure 1:
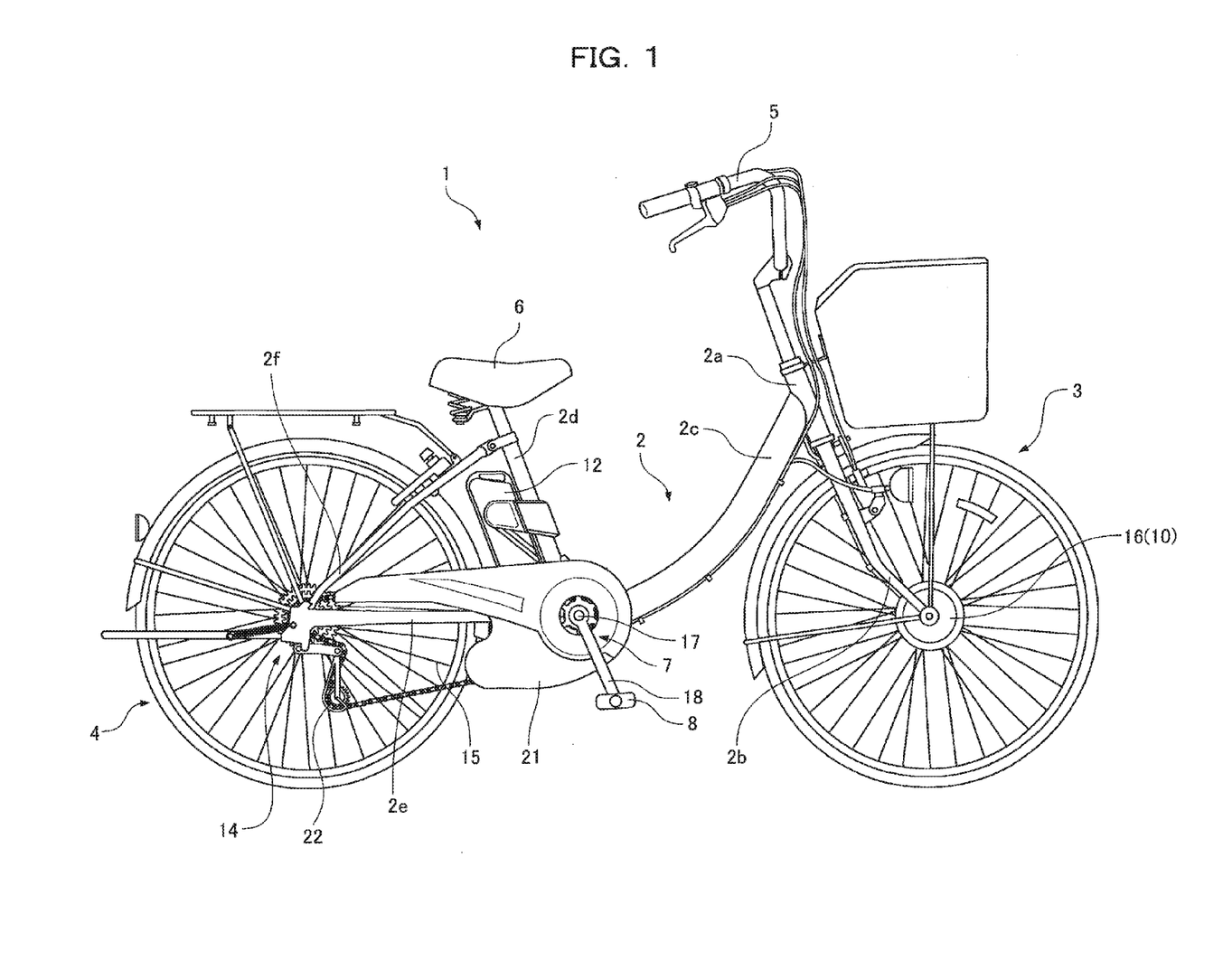
FIG. 1 is an overall side view of an electric bicycle according to an embodiment of the present invention.
Figure 2:
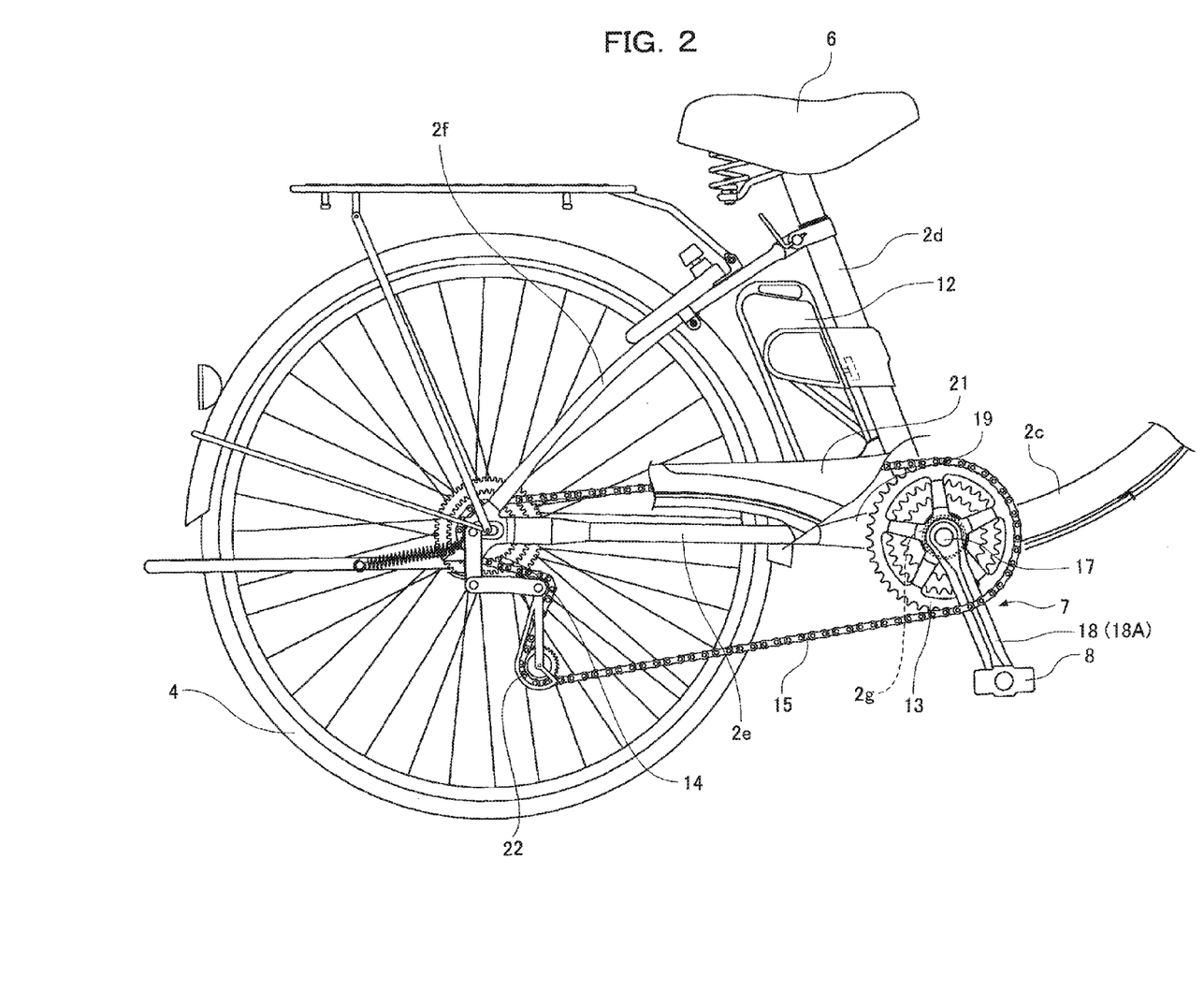
FIG. 2 is a partially cut side view of the electric bicycle.

As shown in FIGS. 1 and 2, reference numeral 1 denotes an electric bicycle including a metallic frame (also called a body frame) 2 composed of a head tube 2a, a front fork 2b, a down tube (also called a down tube 2c) 2c, a vertical pipe (also called a seat tube) 2d, a chain stay 2e, a seat stay 2f, and a hanger (also called a bottom bracket) 2g, a front wheel 3 rotatably attached to the lower end of the front fork 2b, a rear wheel 4 rotatably attached to the rear end of the chain stay 2e, a handle bar 5 that changes the direction of the front wheel 3, a saddle 6, a crank 7 composed of a crankshaft 17 and a pair of crank arms 18, pedals 8 rotatably attached to the ends of the crank arms 18, an electric motor 10 that generates an auxiliary driving force (assist force), a control unit (not shown) that electrically controls various electric devices including the electric motor 10, a battery 12 composed of a secondary battery that supplies driving power to the electric motor 10, a manual operation part (not shown) that is attached to, for example, the handle bar 5 so as to be operated by a rider, a chain ring (also called a front sprocket or a crank gear) 13 serving as a human driving-force output ring attached so as to integrally rotate with the crank 7, a rear sprocket (so-called rear wheel gear) 14 serving as a rear ring attached to the hub (also called a rear hub) of the rear wheel 4, a chain 15 serving as an endless driving force transmitting member looped over the chain ring 13 and the rear sprocket 14, and a chain cover 21 laterally covering the chain 15 and so on. In the present embodiment, the electric motor 10 is disposed in a hub (also called a front hub) 16 of the front wheel 3 while the control unit (not shown) is disposed near the attaching part of the battery 12. The control unit (not shown) may be disposed at another location, for example, the manual operation part. The battery 12 is an example of a storage device. A secondary battery is preferably used but another example of the storage device may be a capacitor. The electric motor 10 may be disposed in the rear hub instead of the front hub 16.

Figure 3:
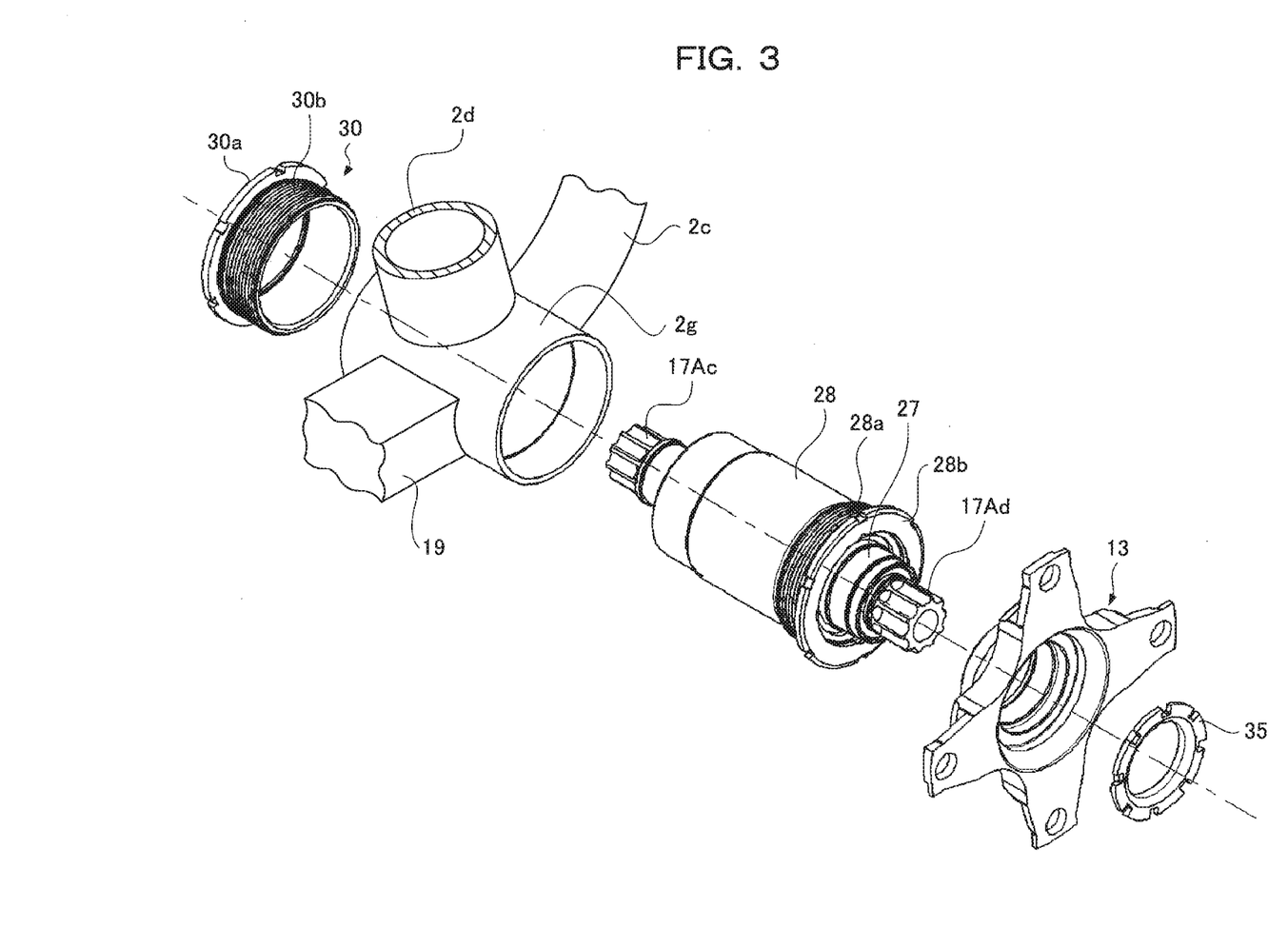
FIG. 3 is an exploded perspective view of a hanger and a crank unit in the electric bicycle.
Figure 4:
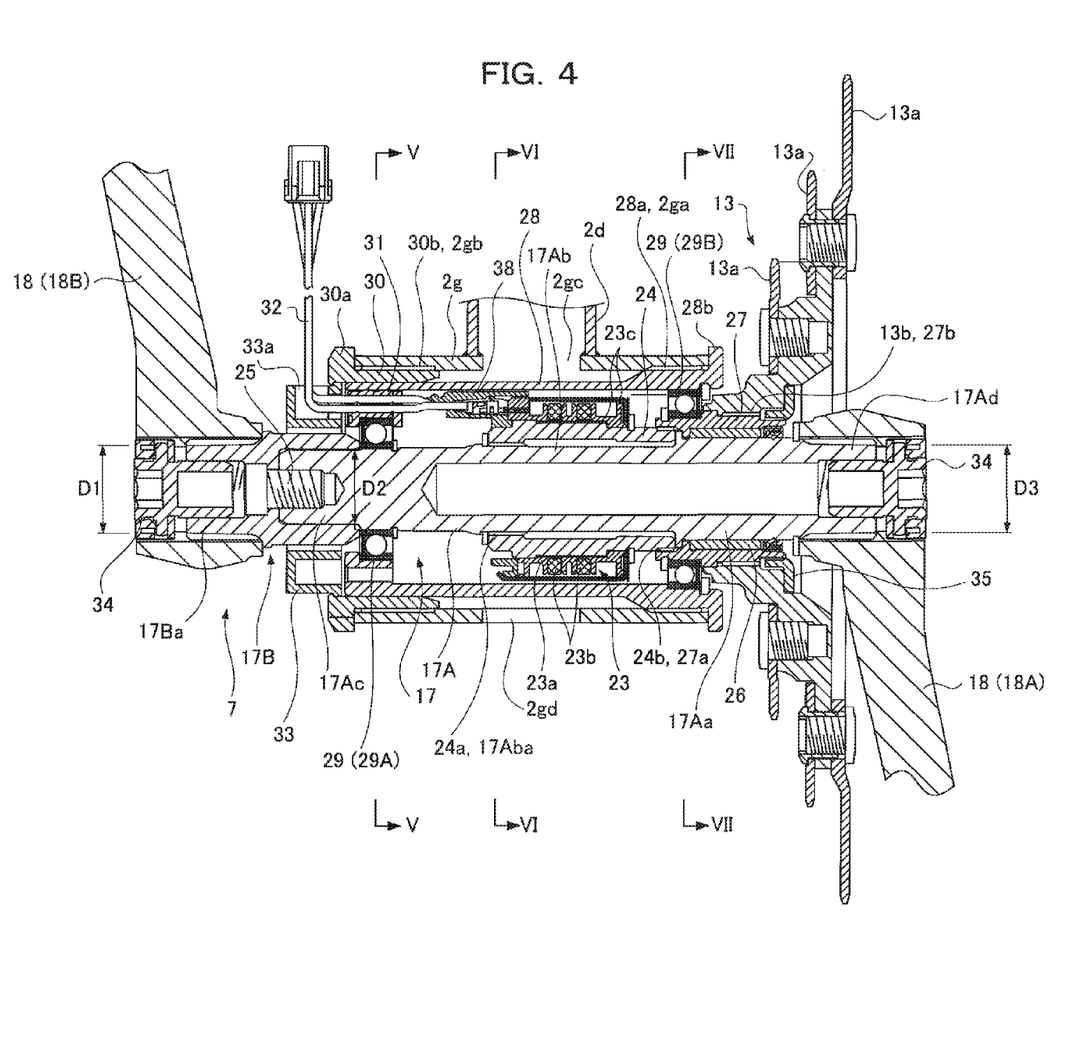
FIG. 4 is a longitudinal section of the hanger of the electric bicycle and a portion near the hanger.

As shown in FIGS. 2 and 3, the hanger 2g is provided so as to connect the rear end of the down tube 2c, the lower end of the vertical pipe 2d, and a battery-mounting bracket 19 connected to the front end of the chain stay 2e. As shown in FIGS. 3 and 4, the crankshaft 17 is rotatably disposed in the hanger 2g and a torque sensor 23 for detecting a force corresponding to a pedal force is disposed in the hanger 2g. FIG. 3 shows only a part supporting a gear portion 13a on the chain ring 13. The gear portion 13a is also called a spider.

As shown in FIG. 4, the crankshaft 17 is divided into a crankshaft body 17A on a periphery of which the torque sensor 23 is provided, and an auxiliary crankshaft 17B connected to one side (the left side in the present embodiment) of the crankshaft body 17A. The crankshaft body 17A and the auxiliary crankshaft 17B are connected to each other with a coupling stud 25. The crankshaft body 17A includes a large-diameter part 17Aa that is located on the right side so as to be coupled to the right crank arm 18(18A) and a small-diameter part 17Ab that has a smaller diameter than the large-diameter part 17Aa and is located at the center and on the left side. Furthermore, a torque detection cylinder (sensing pipe) 24 on a periphery of which a magnetostriction portion 23a of the torque sensor 23 is formed is fit onto the small-diameter part 17Ab of the crankshaft body 17A so as to integrally rotate with the small-diameter part 17Ab that is located substantially at the center of the crankshaft 17 in a lateral direction. Moreover, the left end of the small-diameter part 17Ab of the crankshaft body 17A is connected to the auxiliary crankshaft 17B. A joining section 17Ba between the auxiliary crankshaft 17B and the left crank arm 18(18B) has a diameter D1 that is larger than a diameter D2 of a connecting section (a part of the small-diameter part 17Ab) 17Ac between the crankshaft body 17A and the auxiliary crankshaft 17B. Furthermore, a joining section 17Ad between the crankshaft body 17A and the right crank arm 18(18A) has a diameter D3 that is larger than the diameter D2 of the connecting section (the part of the small-diameter part 17Ab) 17Ac between the crankshaft body 17A and the auxiliary crankshaft 17B. In FIG. 4, reference numeral 34 denotes a locking bolt that locks the crank arm to the crankshaft, and reference numerals 2gc and 2gd denote holes that are formed to discharge rainwater or the like entering from the vertical pipe 2d, to the outside (downward).

Figure 8:
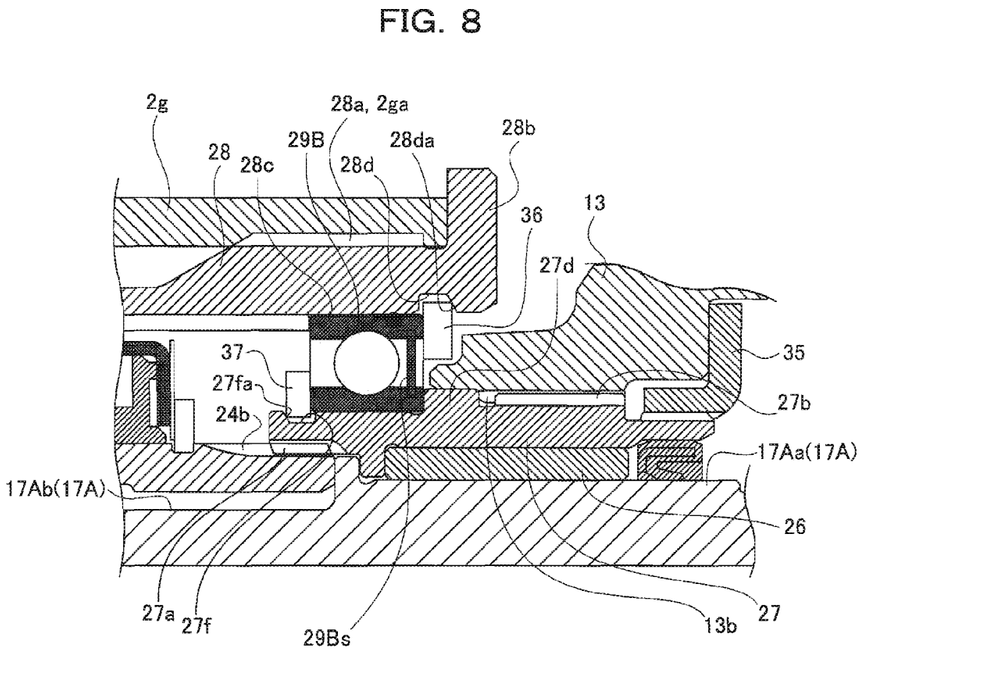
FIG. 8 is an enlarged cross-sectional view showing the principal part of the electric bicycle.

The torque detection cylinder (sensing pipe) 24 is fit onto the crankshaft 17 so as to integrally rotate with the crankshaft 17 such that a toothed part (serration part) 24a formed on the torque detection cylinder 24 is engaged with a toothed part (serration part) 17Aba formed on the outer surface of the small-diameter part 17Ab of the crankshaft body 17A. As shown in FIGS. 4 and 8, a rotary force transmission cylinder 27 is rotatably fit onto the large-diameter part 17Aa of the crankshaft 17 via a large-diameter bearing part 26. The rotary force transmission cylinder 27 has a toothed part (serration part) 27a on the inner surface of the left end. The toothed part (serration part) 27a of the rotary force transmission cylinder 27 is engaged with a toothed part (serration part) 24b formed on the outer surface of the right end of the torque detection cylinder 24. This transmits the rotation of the torque detection cylinder 24 to the rotary force transmission cylinder 27, integrally rotating the rotary force transmission cylinder 27 with the torque detection cylinder 24.

Figure 9:
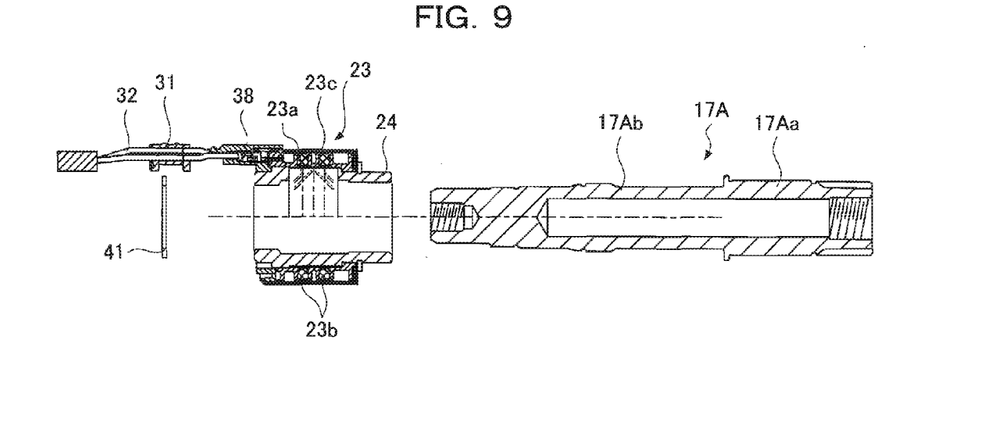
FIG. 9 is a cross-sectional view showing an assembly process for assembling the crankshaft, the crank sensor, and so on of the electric bicycle.
Figure 10:
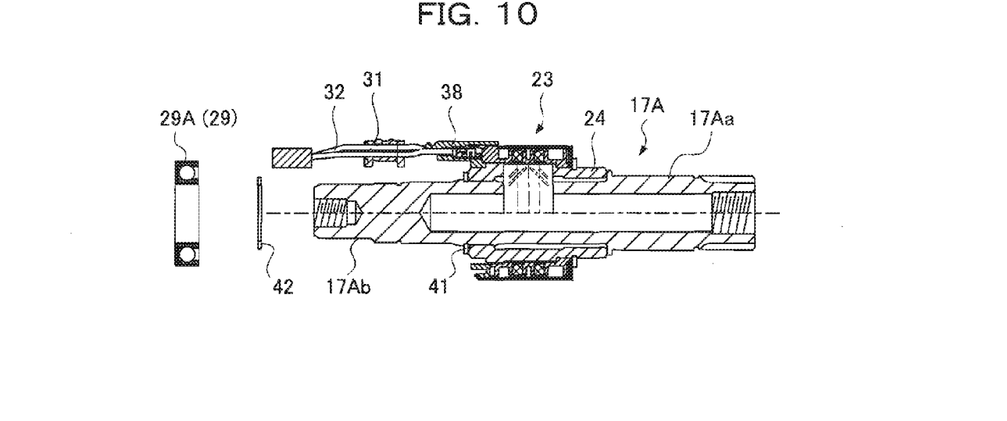
FIG. 10 is a cross-sectional view showing the assembly process of the electric bicycle.

As shown in FIGS. 4, 9, and 10, a part of the outer surface of the torque detection cylinder 24 has the magnetostriction portion 23a that fluctuates in magnetic permeability in response to the application of a pedal force transmitted to the torque detection cylinder 24 through the crankshaft 17 and a search coil 23b that reads a change of magnetic permeability as a change of magnetic flux with a small clearance from the magnetostriction portion 23a. The magnetostriction portion 23a and the search coil 23b constitute the torque sensor 23 that detects a pedal force based on the torsional force of the torque detection cylinder 24. The search coil 23b and a coil holder 23c that holds the search coil 23b are fit onto the torque detection cylinder 24 so as to rotate with respect to the torque detection cylinder 24.

In the present embodiment, the chain ring 13 and the rear sprocket 14 each include a three-speed transmission gear. The chain ring 13 has gear portions 13a that are mounted with large, medium, and small diameters. Moreover, a derailleur 22 (Only FIGS. 1 and 2 show the derailleur 22 on the rear wheel) changes the position of the chain 15 so as to change gears. In this case, the chain ring 13 is fit onto the rotary force transmission cylinder 27 so as to integrally rotate with the rotary force transmission cylinder 27. Moreover, toothed parts (serration parts) 13b and 27b are respectively formed on the inner surface of the chain ring 13 (the inner surface of the spider) and a point on the right side of the outer surface of the rotary force transmission cylinder 27. The toothed parts (serration parts) 13b and 27b are engaged with each other, transmitting the rotation of the rotary force transmission cylinder 27 to the chain ring 13 so as to integrally rotate the chain ring 13 with the rotary force transmission cylinder 27.

Figure 7:
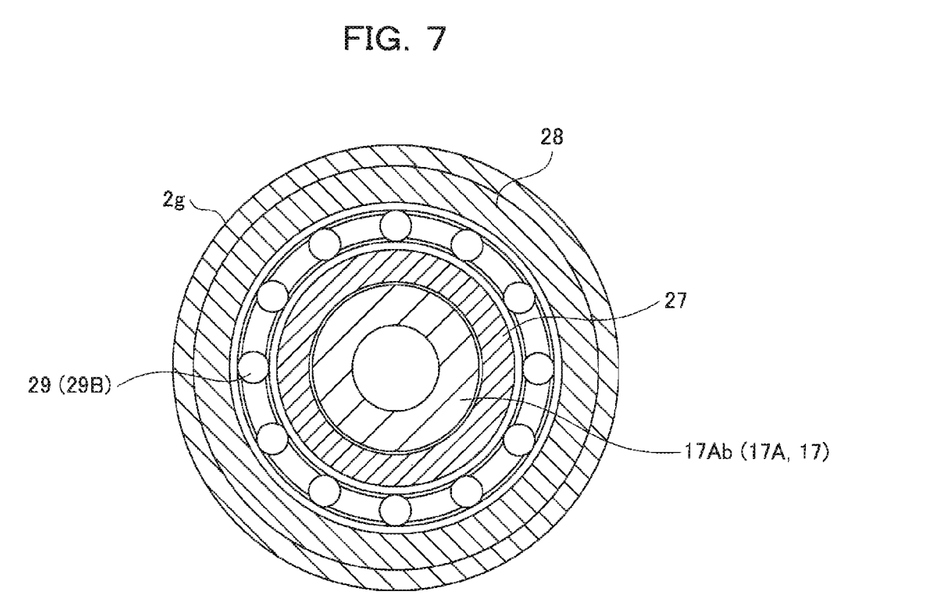
FIG. 7 is a cross-sectional side arrow view of the electric bicycle taken along line VII-VII of FIG. 4.

The hanger 2g contains a metallic inner cylinder 28. The inner cylinder 28 is rotatably supported via left and right bearings 29 (29A, 29B). The left bearing 29A is fixed such that the inner surface of the bearing 29A is mounted near a connecting section between the small-diameter part 17Ab of the crankshaft body 17A and the auxiliary crankshaft 17B while the inner surface of the left end of the inner cylinder 28 having a small diameter is mounted on the outer surface of the left bearing 29A. The right bearing 29B is fixed such that the inner surface of the bearing 29B is mounted on the outer surface of the left end of the rotary force transmission cylinder 27. Each of the bearings 29 has a sealing part on the side (a sealing part 29Bs of the right bearing 29B is shown in FIG. 8 only and is omitted in FIGS. 5 and 7). This prevents water or the like from entering the mounting space of the torque sensor 23 through, for example, the mounting space of the ball portion of the bearing 29. Moreover, an external thread 28a continuing to a flange 28b is formed on the outer surface on the right end of the inner cylinder 28 so as to be screwed into an internal thread 2ga formed on the inner surface of the right end of the hanger 2g. The left end of the inner cylinder 28 is inserted and attached into the left end of the hanger 2g via an auxiliary cylinder 30. Specifically, an external thread 30b formed continuing to a flange 30a of the auxiliary cylinder 30 is screwed and attached into the internal thread 2ga formed on the inner surface of the left end of the hanger 2g. In a state in which the inner cylinder 28 and the auxiliary cylinder 30 are attached to the hanger 2g, the inner cylinder 28 covers the torque sensor 23, the torque detection cylinder 24, and a region on the crankshaft body 17A between the bearings 29.

Figure 5:
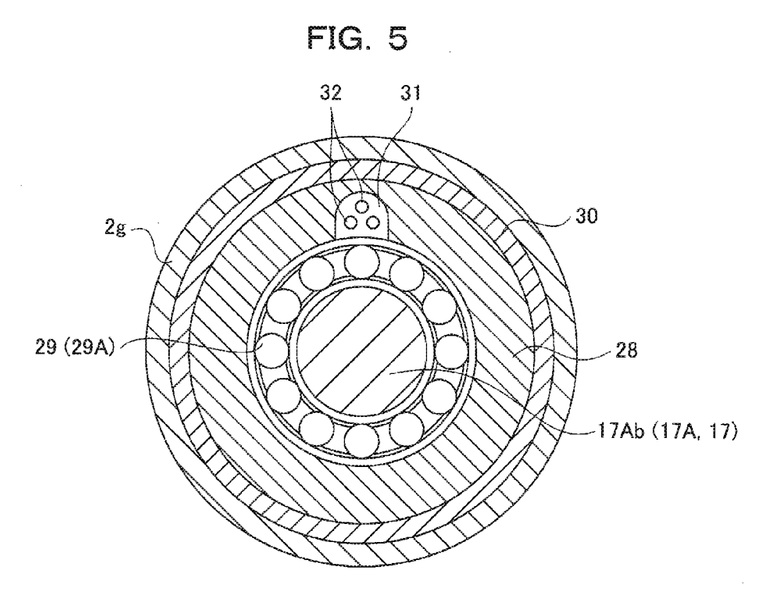
FIG. 5 is a cross-sectional side arrow view of the electric bicycle taken along line V-V of FIG. 4.

The left end of the inner cylinder 28 is radially extended from a contact point with the inner surface of the auxiliary cylinder 30 to a contact point with the outer surface of the left bearing 29A. As shown in FIG. 5, the inner cylinder 28 has a radially extended side part that is partially cut such that a wire guide member 31 is disposed between the left bearing 29A and an inner surface on the outer periphery of the left end of the inner cylinder 28. The wire guide member 31 is made of an elastic material such as rubber. Torque sensor connecting wires 32 connected to the torque sensor 23 penetrate the wire guide member 31 and pass through the side of the wire guide member 31 to the outside of the hanger 2g. A wire cap 33 circular in side view is provided at a position facing the left side of the inner cylinder 28. Moreover, the wire cap 33 covers a portion where the torque sensor connecting wires 32 protrude from the side of the hanger 2g. The outer surface of the wire cap 33 has a partially cut portion. The torque sensor connecting wires 32 are extended out of a cut portion 33a of the wire cap 33.

Figure 6:
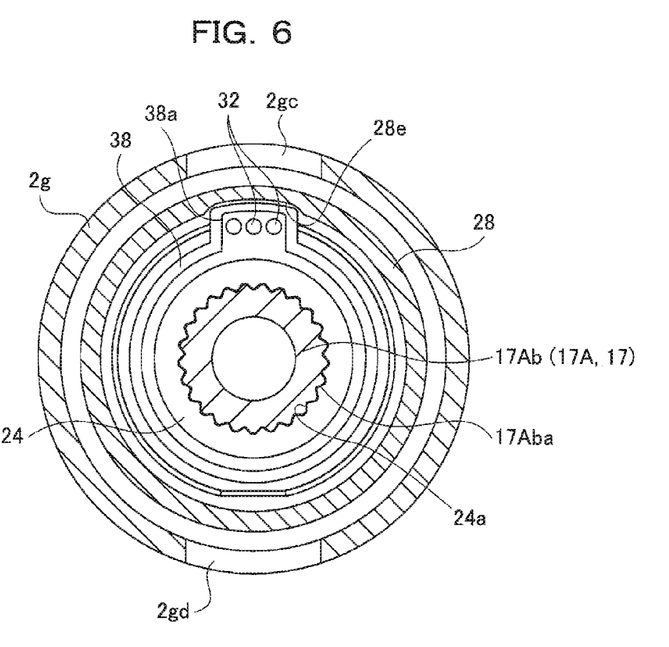
FIG. 6 is a cross-sectional side arrow view of the electric bicycle taken along line VI-VI of FIG. 4.

Moreover, a terminal holder 38 that holds the torque sensor connecting terminal of the torque sensor connecting wire 32 is connected to the coil holder 23c of the torque sensor 23. As shown in FIG. 6, the terminal holder 38 has an annular shape with a protrusion 38a provided in the circumferential direction (in the present embodiment, the upper part of FIG. 6). The terminal holder 38 is connected to the coil holder 23c in a state in which the protrusion 38a is located in a recess 28e formed on the upper end of the inner cylinder 28. Specifically, the search coil 23b and the coil holder 23c of the torque sensor 23 are attached with a small clearance between the search coil 23b and the magnetostriction portion 23a formed on the outer surface of the torque detection cylinder 24. If the search coil 23b and the coil holder 23c of the torque sensor 23 rotate with the torque detection cylinder 24, the protrusion 38a of the terminal holder 38 comes into contact with the inner wall surface of the recess 28e of the inner cylinder 28, regulating the positions of the search coil 23b and the coil holder 23c of the torque sensor 23 in the circumferential direction.

In the present embodiment, the chain ring 13 acting as a human driving force output ring having the gear portions 13a for gear shifting is fit onto the rotary force transmission cylinder 27 such that the position of the chain ring 13 is regulated so as not to move into the hanger 2g in the axial direction of the crankshaft 17. Moreover, the chain ring 13 is attached with an attaching ring 35 fit into the outer surface of the left end of the chain ring 13 such that the position of the chain ring 13 is regulated so as not to move outward in the axial direction of the crankshaft 17.

Specifically, as shown in the enlarged view of FIG. 8, the chain ring 13 is fit onto the rotary force transmission cylinder 27 such that the left end of the toothed part 13b comes into contact with a protrusion 27d formed on the rotary force transmission cylinder 27 from the right side and the position of the chain ring 13 is regulated so as not to move into the hanger 2g in the axial direction of the crankshaft 17. Furthermore, the protrusion 27d comes into contact with the right side of the right bearing 293 and the right bearing 29B comes into contact with a position regulating ring 37 that regulates the position of the right bearing 29B from the left side. This regulates the position of the rotary force transmission cylinder 27 in the axial direction of the crankshaft 17.

The right bearing 29B is attached such that the position of the bearing 29B is regulated in the axial direction of the crankshaft 17 by a step 28c formed on the inner surface near the right end of the inner cylinder 28 and a position regulating ring 36 fit into a groove 28d formed on the inner surface of the right end of the inner cylinder 28. On the groove 28d of the inner cylinder 28 where the position regulating ring 36 is fit and a groove 27f of the rotary force transmission cylinder 27 where the position regulating ring 37 is fit, inclined surfaces 28da and 27fa are formed on the opposite sides from the side where the bearing 29B is provided so as to increase in diameter toward the location of the bearing 29B.

The position regulating rings 36 and 37 are both metallic and elastic and are disposed with reduced diameters in the grooves 28d and 27f. Thus, when the position regulating rings 36 and 37 that regulate the position of the bearing 29B are fit into the grooves 28d and 27f, the position regulating rings 36 and 37 in contact with the inclined surfaces 28da and 27fa increase in diameter so as to be precisely positioned in the axial direction. Thus, the right bearing 29B is precisely positioned in the axial direction. This precisely positions the rotary force transmission cylinder 27 and the chain ring 13 in the axial direction. Moreover, the gear portions 13a of the chain ring 13 are also satisfactorily positioned in the axial direction. Thus, the chain 15 switched for the gear portions 13a does not cause a faulty changing operation.

As shown in FIGS. 3 and 9 to 18, the crankshaft 17 and the torque sensor 23 are assembled into a unit in the inner cylinder 28. A crank unit 40 (FIGS. 14 and 15) assembled into a unit is installed into the hanger 2g.

Figure 11:
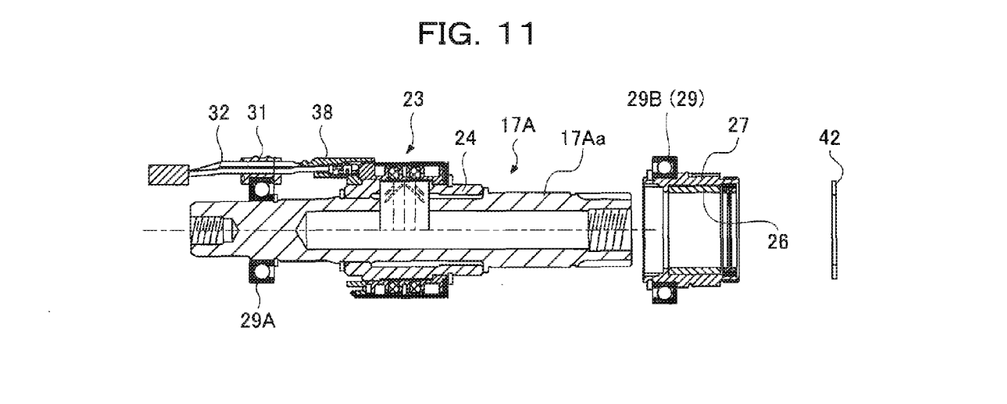
FIG. 11 is a cross-sectional view showing the assembly process of the electric bicycle.
Figure 12:
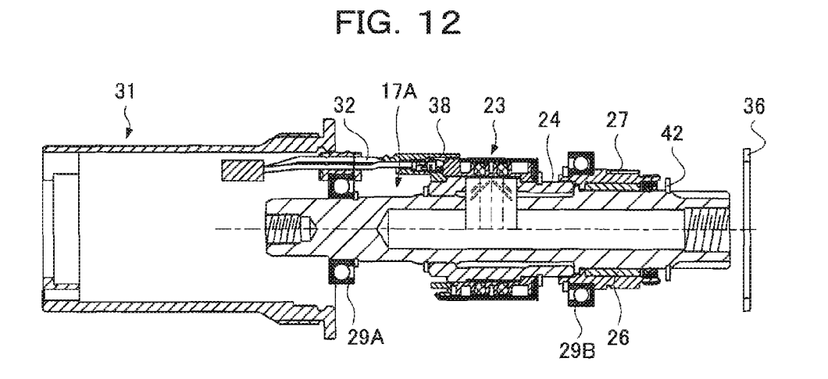
FIG. 12 is a cross-sectional view showing the assembly process of the electric bicycle.

The steps of installation into the hanger 2g will be described below. As shown in FIGS. 9 and 10, first, the crankshaft body 17A (specifically, the small-diameter part 17Ab of the crankshaft body 17A) is inserted in the torque detection cylinder 24 having attached the torque sensor 23 and the like, and then a position regulating ring 41 for regulating the position of the torque detection cylinder 24 is attached to the crankshaft body 17A. Subsequently, as shown in FIGS. 10 and 11, the left bearing 29A and a position regulating ring 42 are attached to the small-diameter part 17Ab of the crankshaft body 17A. As shown in FIGS. 11 and 12, the rotary force transmission cylinder 27 and the position regulating ring (for regulating the position of the right crank arm 18) 42 are fit onto the large-diameter part 17Aa of the crankshaft body 17A with the left bearing 29B, the large-diameter bearing part 26, and so on being attached to the rotary force transmission cylinder 27.

Figure 13:
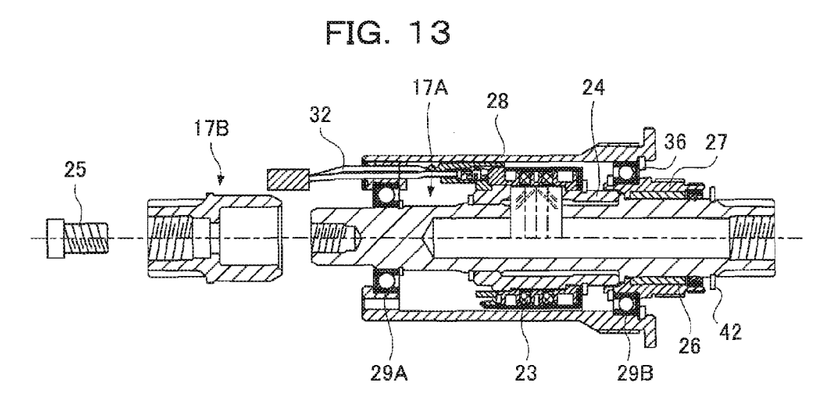
FIG. 13 is a cross-sectional view showing the assembly process of the electric bicycle.
Figure 14:
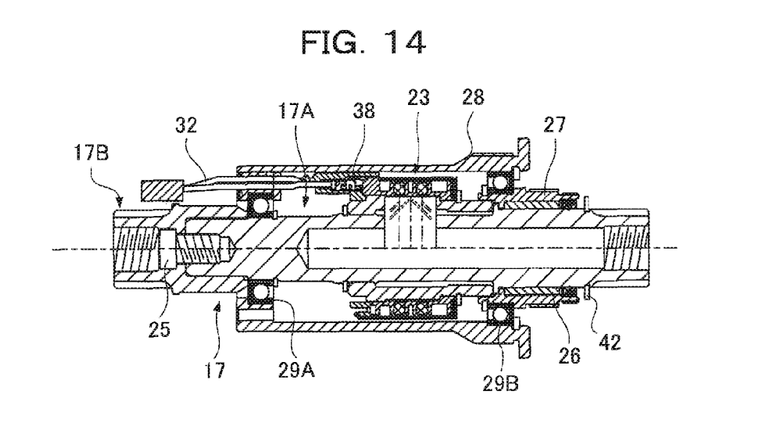
FIG. 14 is a cross-sectional view showing the assembly process of the electric bicycle.

After that, as shown in FIGS. 12 and 13, the crankshaft body 17A is inserted into the inner cylinder 28 with the torque sensor 23, the torque detection cylinder 24, the rotary force transmission cylinder 27, and so on being attached to the crankshaft body 17A. The position regulating ring (for regulating the position of the right bearing 29B) 36 is then attached to the crankshaft body 17A. Subsequently, as shown in FIGS. 13 and 14, the auxiliary crankshaft 173 is attached to the left end of the crankshaft body 17A (the end of the small-diameter part 17Ab) with the coupling stud 25. Thus, the crank unit 40 covered with the inner cylinder 28 is completed with the torque sensor 23 attached to the crankshaft 17.

Figure 15:
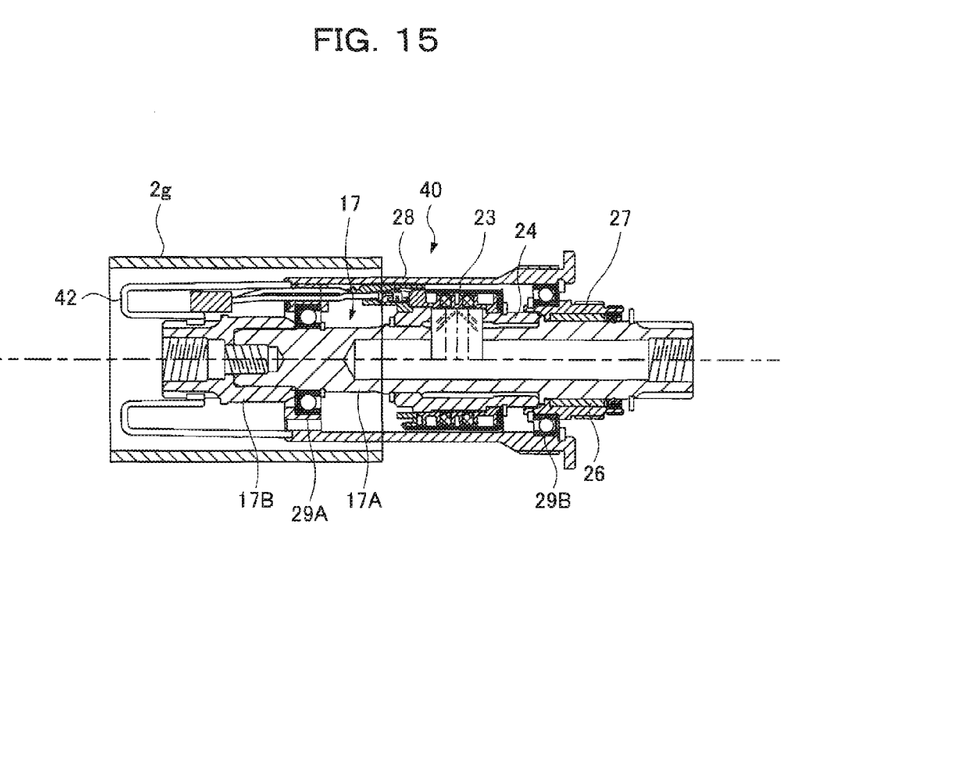
FIG. 15 is a cross-sectional view showing the assembly process of the electric bicycle.
Figure 16:
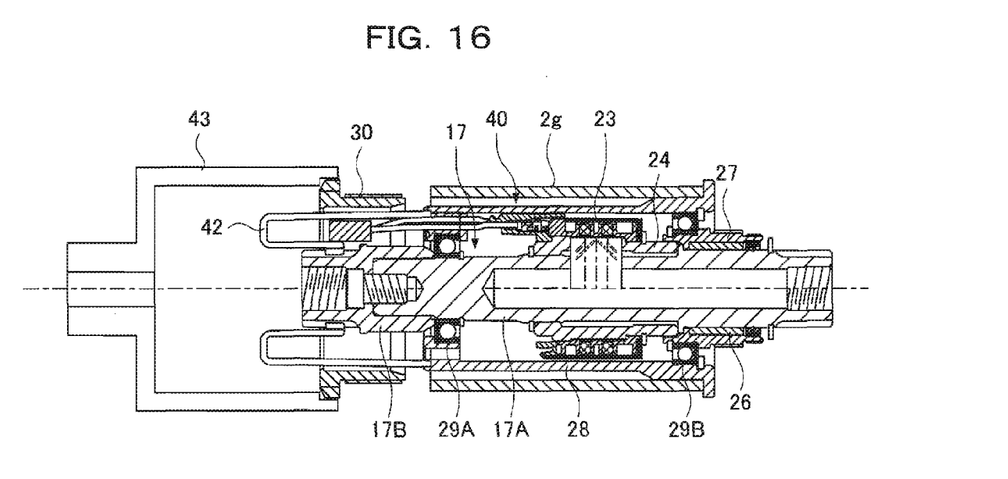
FIG. 16 is a cross-sectional view showing the assembly process of the electric bicycle.
Figure 17:
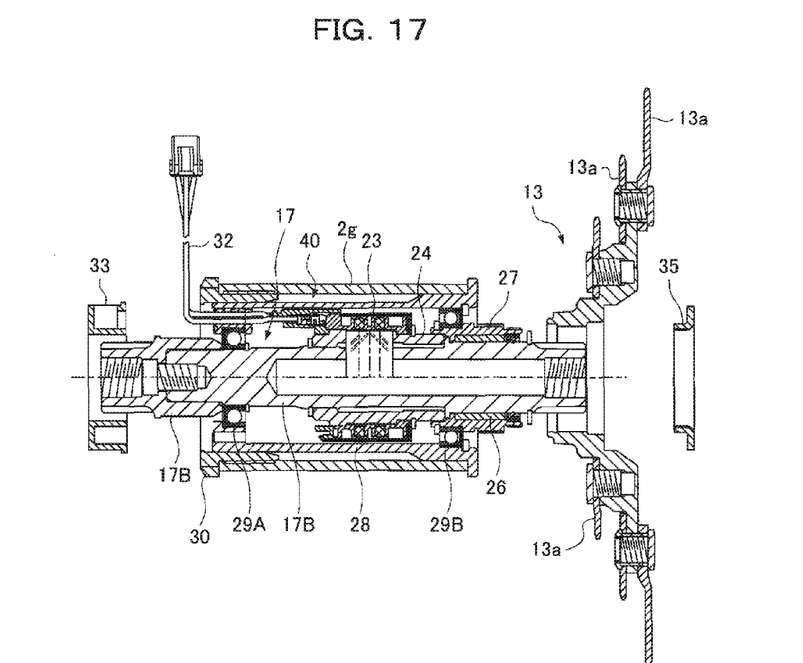
FIG. 17 is a cross-sectional view showing the assembly process of the electric bicycle.
Figure 18:
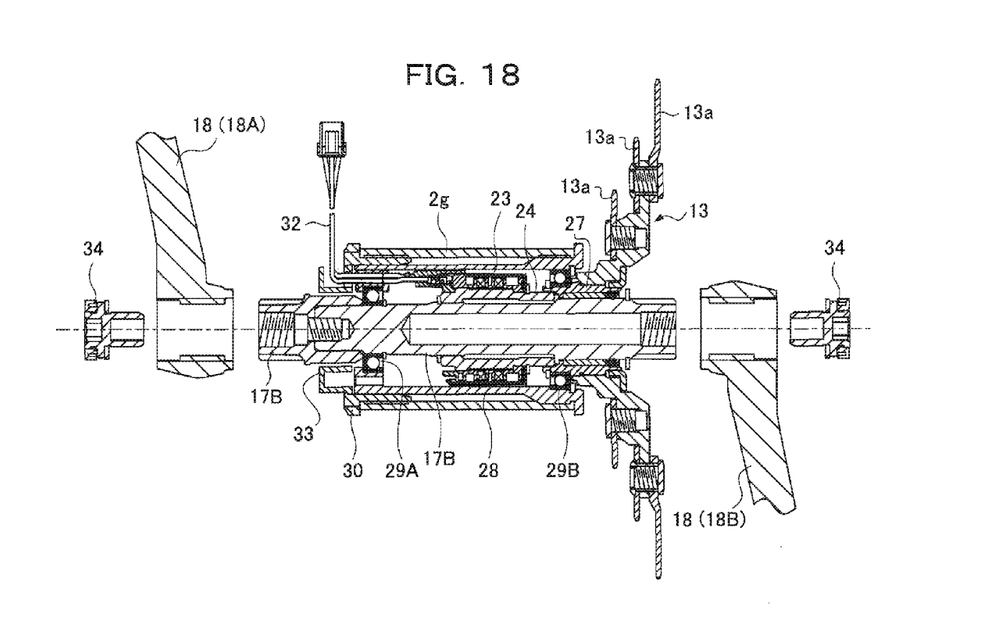
FIG. 18 is a cross-sectional view showing the assembly process of the electric bicycle.

After that, as shown in FIG. 15, the torque sensor connecting wires 32 extended out of the left bearing 29A are covered with the protecting member 42. In this state, the crank unit 40 is inserted into the hanger 2g. Furthermore, as shown in FIG. 16, the auxiliary cylinder 30 is screwed into the hanger 2g with a tool 43 so as to insert the protecting member 42 between the auxiliary cylinder 30 and the inner cylinder 28. As shown in FIG. 17, the wire cap 33 is placed onto the side of the left bearing 29A, and then the torque sensor connecting wires 32 are extended outward in a predetermined direction. The chain ring 13 is then attached to the rotary force transmission cylinder 27 with the attaching ring 35. Finally, as shown in FIG. 18, the crank arms 18 are attached to both ends of the crankshaft 17 with the locking bolts 34. Thus, the crankshaft 17 and the torque sensor 23 can be satisfactorily attached to the hanger 2g.

With this configuration, the crankshaft 17 is divided into the crankshaft body 17A on the periphery of which the torque sensor 23 is provided, and the auxiliary crankshaft 17B connected to one side of the crankshaft body 17A. The diameter D1 of the joining section between the auxiliary crankshaft 17B and the crank arm 18B and the diameter D3 of the joining section 17Ad between the crankshaft body 17A and the right crank arm 18(18A) are larger than the diameter D2 of the connecting section between the crankshaft body 17A and the auxiliary crankshaft 17B. The joining sections between the auxiliary crankshaft 17B, the crankshaft body 17A, and the crank arms 18B and 18A can be increased in diameter, thereby keeping high stiffness. The joining section 17Ad between the crankshaft body 17A and the right crank arm 18(18A) is substantially identical in diameter to the large-diameter part 17Aa of the crankshaft body 17A. This can keep high stiffness for the joining section.

Since the crankshaft 17 is divided into the crankshaft body 17A and the auxiliary crankshaft 17B, even after the torque sensor 23 is attached to the small-diameter part of the crankshaft body 17A, the auxiliary crankshaft 17B is connected to the crankshaft body 17A so as to easily install the crankshaft 17 and the torque sensor 23 into the hanger 2g.

Moreover, the small-diameter part 17Ab having the attached torque sensor 23 on the crankshaft body 17A is identical in diameter to that of a conventional crankshaft. The torque sensor 23 may be identical in size or shape to a conventional torque sensor. Thus, the crankshaft 17, the torque sensor 23, and the hanger 2g can be small in size (suppressed increase in size) and the use of a conventional torque sensor can suppress manufacturing cost. In other words, in the case of a crankshaft having a larger diameter than a conventional crankshaft and a torque sensor sized accordingly, a new and large torque sensor is used. This may require an extremely large hanger and cause uncomfortable feeling. Moreover, a new torque sensor is necessary and thus may considerably increase the manufacturing cost. These problems do not arise in the present structure.

With this configuration, the wire guide member 31 is disposed between the right bearing 29A that rotatably supports the crankshaft body 17A and the inner cylinder 28 disposed in the hanger 2g, and the torque sensor connecting wires 32 are laterally extended out of the hanger 2g through the wire guide member 31. Thus, the torque sensor connecting wires 32 can be satisfactorily extended out of the hanger 2g. Moreover, the wire cap 33 circular in side view is provided so as to cover a portion where the torque sensor connecting wires 32 protrude from the side of the hanger 2g. Thus, the torque sensor connecting wires 32 extended from any position in the circumferential direction of the hanger 2g can be extended from a predetermined point of the wire cap 33. In other words, the crank unit 40 where the crankshaft 17 and the torque sensor 23 are attached is screwed into the hanger 2g. This does not fix the position of extending the torque sensor connecting wires 32 in the circumferential direction of the hanger 2g. The torque sensor connecting wires 32 extended from any point can be extended in the predetermined direction from the wire cap 33 because the torque sensor connecting wires 32 are circumferentially provided in the wire cap 33. Thus, the torque sensor connecting wires 32 can be satisfactorily covered with the wire cap 33, improving the appearance.

Furthermore, the metallic inner cylinder 28 is provided in the hanger 2g with the bearings 29 (29A, 29B) disposed in both ends of the inner cylinder 28 so as to rotatably support the crankshaft body 17A. The inner cylinder 28 covers the torque sensor 23, the torque detection cylinder 24, and the region between the bearings 29 (29A, 29B) on the crankshaft body 17A. Even if rainwater enters the hanger 2g through the vertical pipe 2d, the inner cylinder 28 prevents rainwater from entering the location of the torque sensor 23, improving reliability. Moreover, the metallic inner cylinder 28 can prevent external noise from entering the signal lines (torque sensor connecting wires 32) of the torque sensor 23, also improving reliability. Furthermore, the locations of the crankshaft 17 and the torque sensor 23 can be combined into a unit covered with the inner cylinder 28. Thus, the crankshaft 17 and the torque sensor 23 can be relatively easily installed into the hanger 2g with high efficiency.

With this configuration, the rotary force transmission cylinder 27 is rotatably fit onto the large-diameter part 17Aa of the crankshaft body 17A via the large-diameter bearing part 26, the rotary force transmission cylinder 27 and the torque detection cylinder 24 are connected so as to integrally rotate with each other, and the chain ring 13 having the gear portions 13a in multiple stages is fit onto the rotary force transmission cylinder 27 so as to integrally rotate with each other. Thus, even if a large force is applied from the chain ring 13 to the crankshaft body 17A and so on when the derailleur 22 changes the position of the chain 15 to switch the gear portions 13a, the force can be satisfactorily received by the large-diameter part 17Aa of the crankshaft body 17A. This improves the reliability of the electric bicycle 1.

With this configuration, the rotary force transmission cylinder 27 is rotatably disposed via the right bearing 29B on the inner cylinder 28 provided in the hanger 2g, the chain ring 13 having the gear portions 13a in the multiple stages is fit onto the rotary force transmission cylinder 27, the position regulating ring 36 that regulates the position of the right bearing 29B in the axial direction is fit into the groove 28d formed on the inner cylinder 28, the inclined surface 28da is formed in the groove 28d so as to increase in diameter toward the location of the bearing, and the position regulating ring 36 with a reduced diameter is disposed in the groove 28d. Thus, the chain ring 13 is fit onto the rotary force transmission cylinder 27 such that the position of the chain ring 13 is satisfactorily regulated in contact with the bearing 29B so as not to move into the hanger 2g. This can prevent the occurrence of problems that may cause a faulty changing operation on the gear portions 13a of the chain 15, thereby improving the reliability of the bicycle 1.

In the present embodiment, the transmission path of a human driving force between the crankshaft 17 and the chain ring 13 does not include a mechanism that does not transmit a rotary force, e.g., a one-way clutch. The present invention is preferably applied if a coaster brake operated by rotating pedals in an opposite direction is disposed on the hub of a rear wheel. The present invention is not limited to the coaster brake and is also applicable to an ordinary brake, e.g., a drum brake operated by a brake lever provided on a handle bar.

In the present embodiment, the chain 15 is a driving force transmitting member that transmits a pedal force from the pedal 8 to the rear wheel 4. The present invention is not limited to the driving force transmitting member and thus the chain 15 may be replaced with a toothed belt. In the case of a toothed belt (driving force transmitting toothed belt), the chain ring 13 may be replaced with a driving front gear as a human driving force output ring for outputting a human driving force while the rear sprocket 14 may be replaced with a rear gear as a rear ring provided on the hub of the rear wheel.

INDUSTRIAL APPLICABILITY

The present invention is applicable to various electric bicycles that can be driven by adding an auxiliary driving force generated by an electric motor to a human driving force generated by a pedal force from a pedal.

The invention claimed is:

1. An electric bicycle that can be driven by adding an auxiliary driving force generated by an electric motor to a human driving force generated by a pedal force from a pedal, the electric bicycle comprising:
    a torque sensor that detects a force corresponding to a pedal force with a crankshaft rotatably disposed in a hanger coupled to a lower end of a vertical pipe,
    wherein the crankshaft is divided into a crankshaft body on a periphery of which the torque sensor is disposed, and an auxiliary crankshaft connected to one side of the crankshaft body,
    a diameter of a joining section between the auxiliary crankshaft and a crank arm and a diameter of a joining section between the crankshaft body and the crank arm are larger than a diameter of a connecting section between the crankshaft body and the auxiliary crankshaft,
    a point of the crankshaft body near a joining section between the crankshaft body and the auxiliary crankshaft is rotatably supported by a bearing,
    a wire guide member is disposed between the bearing and a metallic inner cylinder disposed in the hanger, and
    the torque sensor is connected to a torque sensor connecting wire that is laterally extended out of the hanger through the wire guide member.

2. The electric bicycle according to claim 1, wherein the crankshaft body has a large-diameter part and a small-diameter part having a smaller diameter than the large-diameter part,
    the small-diameter part has a torque detection cylinder that is fit onto the small-diameter part so as to integrally rotate with the small-diameter part, the torque sensor having a magnetostriction portion on a periphery of the torque detection cylinder, and
    the auxiliary crankshaft is coupled to an end of the small-diameter part.

3. The electric bicycle according to claim 1, wherein a portion where the torque sensor connecting wire protrudes from a side of the hanger is covered with a wire cap circular in side view.

4. The electric bicycle according to claim 1, wherein the hanger contains the metallic inner cylinder having bearings provided in both of left and right ends of the metallic inner cylinder, the bearings rotatably supporting the crankshaft body, and
    the metallic inner cylinder covers the torque sensor, a torque detection cylinder on the periphery of which a magnetostriction portion of the torque sensor is formed, and a region between the bearings on the crankshaft body.

5. An electric bicycle that can be driven by adding an auxiliary driving force generated by an electric motor to a human driving force generated by a pedal force from a pedal, the electric bicycle comprising:
    a torque sensor that detects a force corresponding to a pedal force with a crankshaft rotatably disposed in a hanger coupled to a lower end of a vertical pipe,
    wherein the crankshaft is divided into a crankshaft body on a periphery of which the torque sensor is disposed, and an auxiliary crankshaft connected to one side of the crankshaft body,
    a diameter of a joining section between the auxiliary crankshaft and a crank arm and a diameter of a joining section between the crankshaft body and the crank arm are larger than a diameter of a connecting section between the crankshaft body and the auxiliary crankshaft,
    wherein the crankshaft body has a large-diameter part and a small-diameter part having a smaller diameter than the large-diameter part,
    the small-diameter part has a torque detection cylinder that is fit onto the small-diameter part so as to integrally rotate with the small-diameter part, the torque sensor having a magnetostriction portion on a periphery of the torque detection cylinder, and
    the auxiliary crankshaft is coupled to an end of the small-diameter part,
    the large-diameter part of the crankshaft body has a rotary force transmission cylinder that is rotatably fit onto the large-diameter part via a large-diameter bearing part,
    the rotary force transmission cylinder and the torque detection cylinder are connected so as to integrally rotate with each other, and
    the rotary force transmission cylinder has a human driving force output ring with gear portions in multiple stages, the human driving force output ring being fit onto the rotary force transmission cylinder so as to integrally rotate with the rotary force transmission cylinder.

6. The electric bicycle according to claim 5, wherein the rotary force transmission cylinder is rotatably disposed via bearings on a metallic inner cylinder provided in the hanger,
    the human driving force output ring having the gear portions in the multiple stages is fit onto the rotary force transmission cylinder,
    a position regulating ring that regulates a position of the bearings in an axial direction is fit into a groove formed on the metallic inner cylinder,
    the groove has an inclined surface that increases in diameter toward a location of the bearings, and
    a position regulating ring with a reduced diameter is disposed in the groove.

* * * * *